(12) United States Patent
Wu et al.

(10) Patent No.: US 11,507,706 B2
(45) Date of Patent: Nov. 22, 2022

(54) VERIFICATION METHOD AND SYSTEM

(71) Applicant: REALTEK SEMICONDUCTOR CORPORATION, Hsinchu (TW)

(72) Inventors: Shiue-Ru Wu, Hsinchu (TW); Ching-Tung Wu, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 192 days.

(21) Appl. No.: 17/158,819

(22) Filed: Jan. 26, 2021

(65) Prior Publication Data
US 2021/0240871 A1 Aug. 5, 2021

(30) Foreign Application Priority Data
Feb. 5, 2020 (TW) ................................ 109103568

(51) Int. Cl.
*G06F 21/78* (2013.01)
*G06F 21/79* (2013.01)
*G06F 9/4401* (2018.01)
*H04L 9/30* (2006.01)
*H04L 9/32* (2006.01)
(Continued)

(52) U.S. Cl.
CPC ............. *G06F 21/79* (2013.01); *G06F 3/062* (2013.01); *G06F 3/068* (2013.01); *G06F 3/0659* (2013.01); *G06F 9/4401* (2013.01); *H04L 9/0643* (2013.01); *H04L 9/0825* (2013.01); *H04L 9/30* (2013.01); *H04L 9/3247* (2013.01)

(58) Field of Classification Search
CPC ........ G06F 21/79; G06F 3/062; G06F 3/0659; G06F 3/068; G06F 9/4401; G06F 21/575; H04L 9/0643; H04L 9/0825; H04L 9/30; H04L 9/3247; H04L 9/3236
See application file for complete search history.

(56) References Cited

U.S. PATENT DOCUMENTS 6,625,730 B1* 9/2003 Angelo ............... G06F 11/1417
713/1
9,158,921 B1 10/2015 Gupta et al.
(Continued)

FOREIGN PATENT DOCUMENTS

EP 2741228 A2 * 6/2014 ............. G06F 12/14
JP 6963058 B1 * 11/2021
(Continued)

*Primary Examiner* — Sher A Khan
(74) *Attorney, Agent, or Firm* — WPAT, P.C., Intellectual Property Attorneys; Anthony King (57) ABSTRACT

The application discloses a verification method and system. The verification method is for verifying content of a first volatile read-write memory of a chip. A first non-volatile read-write memory of the chip stores a firmware image, including predetermined calculation value. The chip includes a second volatile read-write memory. The verification method includes: at a bootloader mode, loading a first portion and a second portion of the firmware image to the first volatile read-write memory and the second volatile read-write memory respectively; performing a first specific operation to the first portion and the second portion to obtain a first calculation value; performing a second specific operation to the first calculation value to obtain a second calculation value and storing the second calculation value in the second volatile read-write memory.

20 Claims, 7 Drawing Sheets

(51) Int. Cl.
*G06F 3/06* (2006.01)
*H04L 9/08* (2006.01)
*H04L 9/06* (2006.01)

(56) References Cited

U.S. PATENT DOCUMENTS

| | | | | |
|---|---|---|---|---|
| 10,193,884 | B1* | 1/2019 | Griffin | G06F 21/33 |
| 10,789,062 | B1* | 9/2020 | Suryanarayana | G06F 8/65 |
| 2013/0191624 | A1* | 7/2013 | Jarmay | G11C 5/14 |
| | | | | 713/2 |
| 2014/0089650 | A1* | 3/2014 | Polzin | G06F 21/81 |
| | | | | 713/2 |
| 2015/0261521 | A1* | 9/2015 | Choi | H04L 9/3236 |
| | | | | 713/176 |
| 2016/0378990 | A1* | 12/2016 | Goodman | G06F 21/572 |
| | | | | 726/19 |
| 2017/0364683 | A1* | 12/2017 | Willden | G06F 12/14 |
| 2018/0341584 | A1* | 11/2018 | Letey | G06F 21/74 |
| 2021/0103684 | A1* | 4/2021 | Datta | G06F 21/575 |

FOREIGN PATENT DOCUMENTS

| | | | | |
|---|---|---|---|---|
| KR | 20220040847 A | * | 3/2022 | G06K 9/00221 |
| WO | WO-2004010365 A2 | * | 1/2004 | G06K 9/00221 |

* cited by examiner

VERIFICATION METHOD AND SYSTEM

CROSS REFERENCE TO RELATED APPLICATIONS

This application claims priority of Taiwan application No. 109103568 filed on Feb. 5, 2020, which is incorporated by reference in its entirety.

BACKGROUND

Field of the Invention

The present disclosure relates to a verification method; in particular, to a verification method for verifying a content of a memory of a chip and an associated system.

Description of Related Art

In some system-on-chip (SoC) applications, there are high security requirements; for example, when booting certain SoCs used in the Internet of Things (IoT), firmware to be loaded must be verified first before being loaded into the memory inside and outside the SoCs, and when the SoCs leave from the power saving mode, it is necessary to redo the complete verification and loading procedures, which takes a long time and will result in increased system power consumption. Therefore, how to balance security requirements and performance has become an urgent issue remained to be solved in this field.

BRIEF SUMMARY OF THE INVENTION

Some embodiments of the present disclosure provide a verification method for verifying a content of a first volatile read-write memory of a chip, wherein a first non-volatile read-write memory of the chip stores a firmware image, the firmware image includes a predetermined calculation value, the chip includes a second volatile read-write memory, and the verification method includes: verifying the firmware image of the first non-volatile read-write memory at a bootloader mode; loading a first portion of the firmware image into the first volatile read-write memory, and loading a second portion of the firmware image into the second volatile read-write memory; performing a first specific operation according to the first portion loaded into the first volatile read-write memory and the second portion loaded into the second volatile read-write memory to obtain a first calculation value; when the first calculation value matches with the predetermined calculation value, performing a second specific operation according to the first calculation value to obtain a second calculation value; and storing the second calculation value in the second volatile read-write memory and entering an active mode.

Some embodiments of the present disclosure provide a verification method for verifying a content of a first volatile read-write memory of a chip, wherein a first non-volatile read-write memory of the chip stores a firmware image, the firmware image includes a predetermined calculation value, the chip includes a second volatile read-write memory, and the verification method includes: verifying the firmware image of the first non-volatile read-write memory at a bootloader mode; loading a first portion of the firmware image into the first volatile read-write memory, and loading a second portion of the firmware image into the second volatile read-write memory; performing a first specific operation according to the first portion loaded into the first volatile read-write memory and the second portion loaded into the second volatile read-write memory to obtain a first calculation value; when the first calculation value matches with the predetermined calculation value, storing the first calculation value in the second volatile read-write memory and entering an active mode.

Some embodiments of the present disclosure provide a system, includes: a first volatile read-write memory; and a first non-volatile read-write memory, configured to store a firmware image, wherein the firmware image includes a predetermined calculation value; a chip, coupled to the first volatile read-write memory and the first non-volatile read-write memory, the chip including: a second volatile read-write memory; a verification program memory, configured to store a verification program; a processor, configured to perform a verification method for verifying a content of the first volatile read-write memory according to the verification program, the verification method including: verifying the firmware image of the first non-volatile read-write memory at a bootloader mode; loading a first portion of the firmware image into the first volatile read-write memory and loading a second portion of the firmware image into the second volatile read-write memory; performing a first specific operation according to the first portion loaded into the first volatile read-write memory and the second portion loaded into the second volatile read-write memory to obtain a first calculation value; when the first calculation value matches with the predetermined calculation value, performing a second specific operation according to the first calculation value to obtain a second calculation value; and storing the second calculation value in the second volatile read-write memory and entering an active mode.

The present verification method and associated system is able to simplify the procedures of leaving from the power saving mode.

BRIEF DESCRIPTION OF THE DRAWINGS

Aspects of the present disclosure are best understood from the following detailed description when read with the accompanying figures. It should be noted that, in accordance with the standard practice in the field, various features are not drawn to scale. In fact, the dimensions of the various features may be arbitrarily increased or reduced for clarity of discussion.

DETAILED DESCRIPTION

Figure 1:
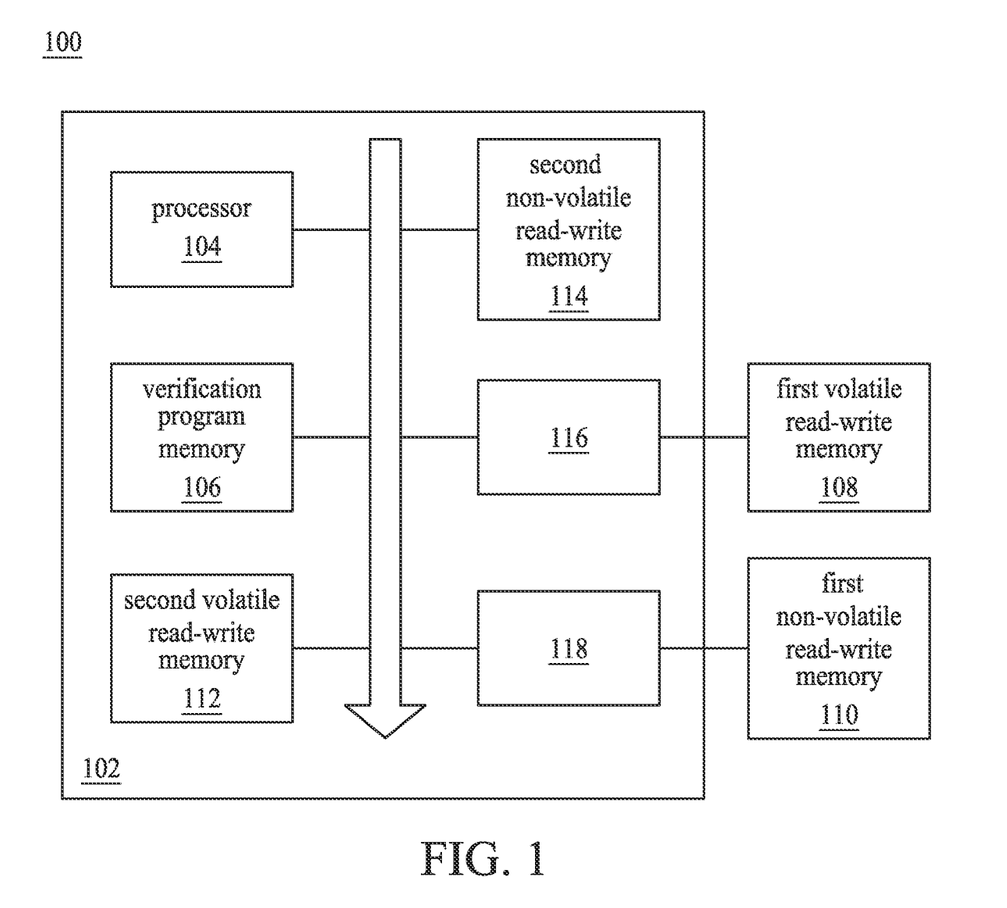
FIG. 1 is a schematic diagram of a system according to embodiments of the present disclosure.

FIG. 1 is a schematic diagram of a system according to embodiments of the present disclosure. The system 100 includes a chip 102 and a first volatile read-write memory 108 (hereinafter, memory 108) and a first non-volatile read-write memory 110 (hereinafter, memory 110) outside the chip. The chip 102 may be a system-on-chip (SoC), which includes a processor 104 and several internal memories. The chip 102 further includes memory driving modules 116 and 118 for driving the memory 108 and memory 110 outside the chip. The above-mentioned internal memories include a verification program memory 106 (hereinafter, memory 106), a second volatile read-write memory 112 (hereinafter, memory 112) and a second non-volatile read-write memory 114 (hereinafter, memory 114). In this embodiment, the memory 106 can be a non-volatile read only memory (ROM); the memory 114 can be a non-volatile one-time programmable memory (OTP); the memory 108 can be a dynamic random-access memory (DRAM); the memory 112 can be a static random-access memory (SRAM); the memory 110 can be a flash memory; the above embodiment of memories is only exemplary, and the present invention is not limited thereto.

Figure 2:
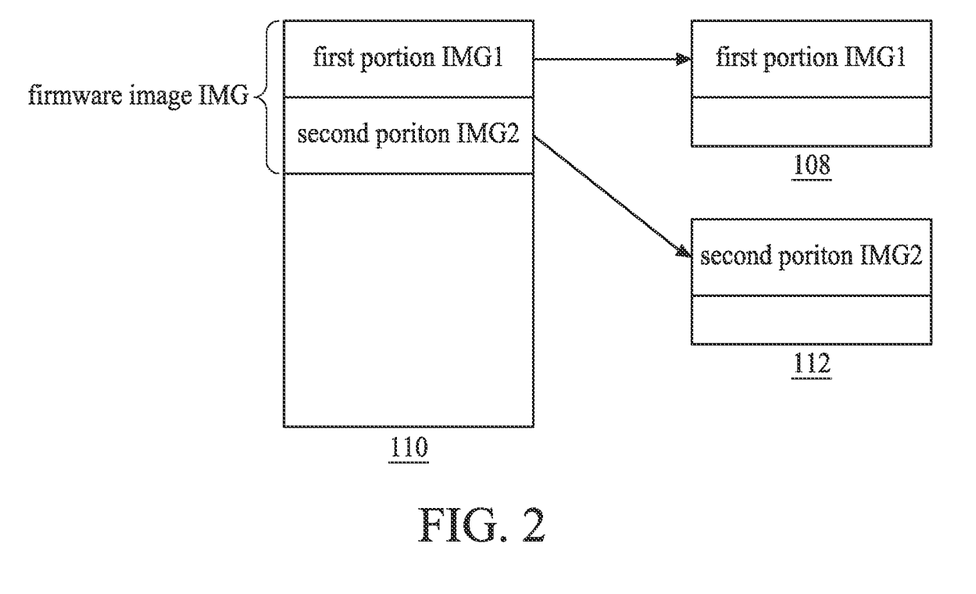
FIG. 2 is a schematic diagram illustrating loading of a firmware image.
Figure 3:
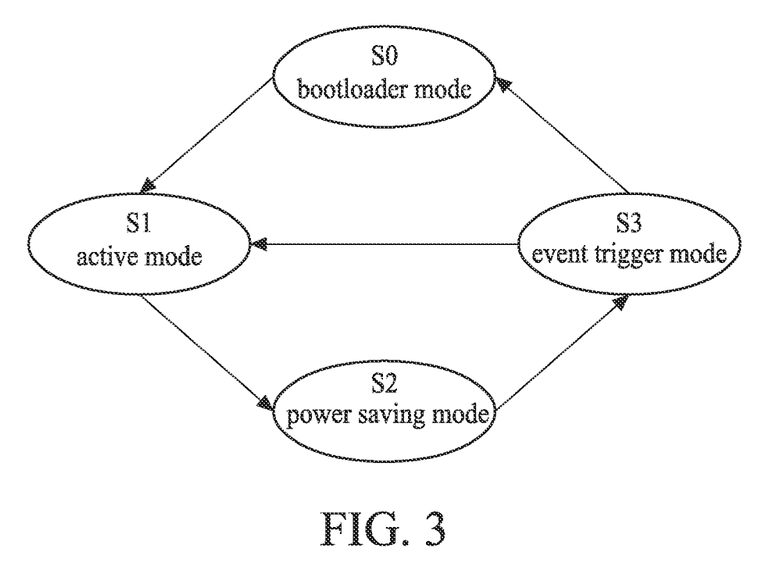
FIG. 3 is a schematic diagram illustrating four operation modes of a chip.

Reference is made to both FIG. 2 and FIG. 3, an executable program (e.g., operation system and/or application software) required by the chip 102 are stored in the memory 110 in the form of a firmware image IMG, and when the chip 102 is at a bootloader mode S0, the chip 102 loads the first portion IMG1 of the firmware image IMG from the memory 110 into the memory 108 outside the chip 102; and loads a second portion IMG2 of the firmware image IMG from the memory 110 into the memory 112 inside the chip 102. Generally speaking, the memory 108 outside the chip 102 is easier to be tampered than the memory 112 inside the chip 102, so the purpose of the present disclosure is to protect the memory 108 outside the chip 102 from being tampered at all modes illustrated in FIG. 3. It should be noted that the present disclosure does not limit whether the firmware image IMG must be partially loaded into the memory 112; for example, in some embodiments, the entire firmware image IMG is loaded from the memory 110 to the memory 108. Moreover, in some embodiments, the firmware image IMG further includes a third portion that is executed directly on the memory 110 without being loaded into other memories.

Figure 4:
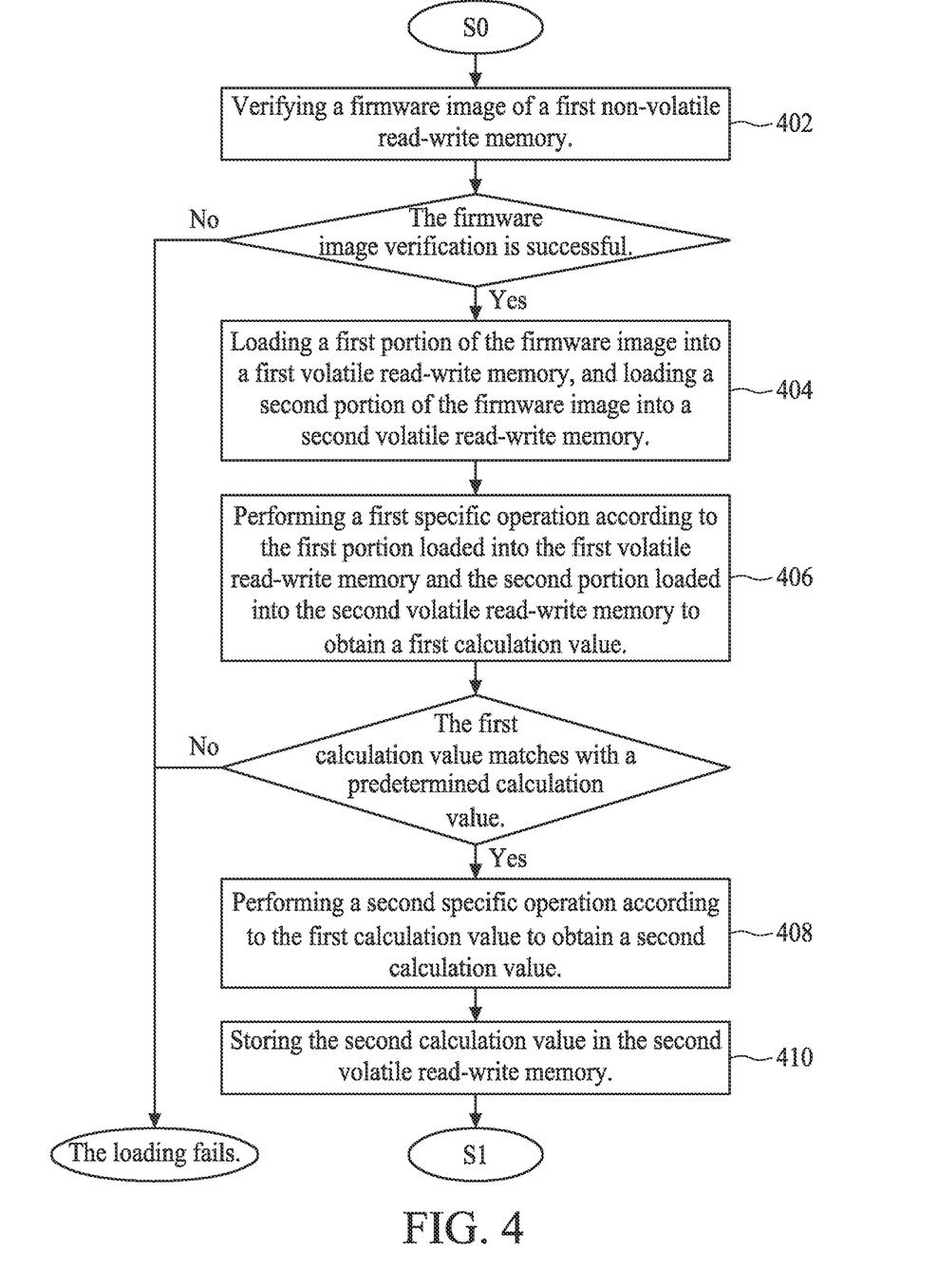
FIG. 4 and FIG. 5 illustrate a first embodiment of the verification method according to the present disclosure.
Figure 5:
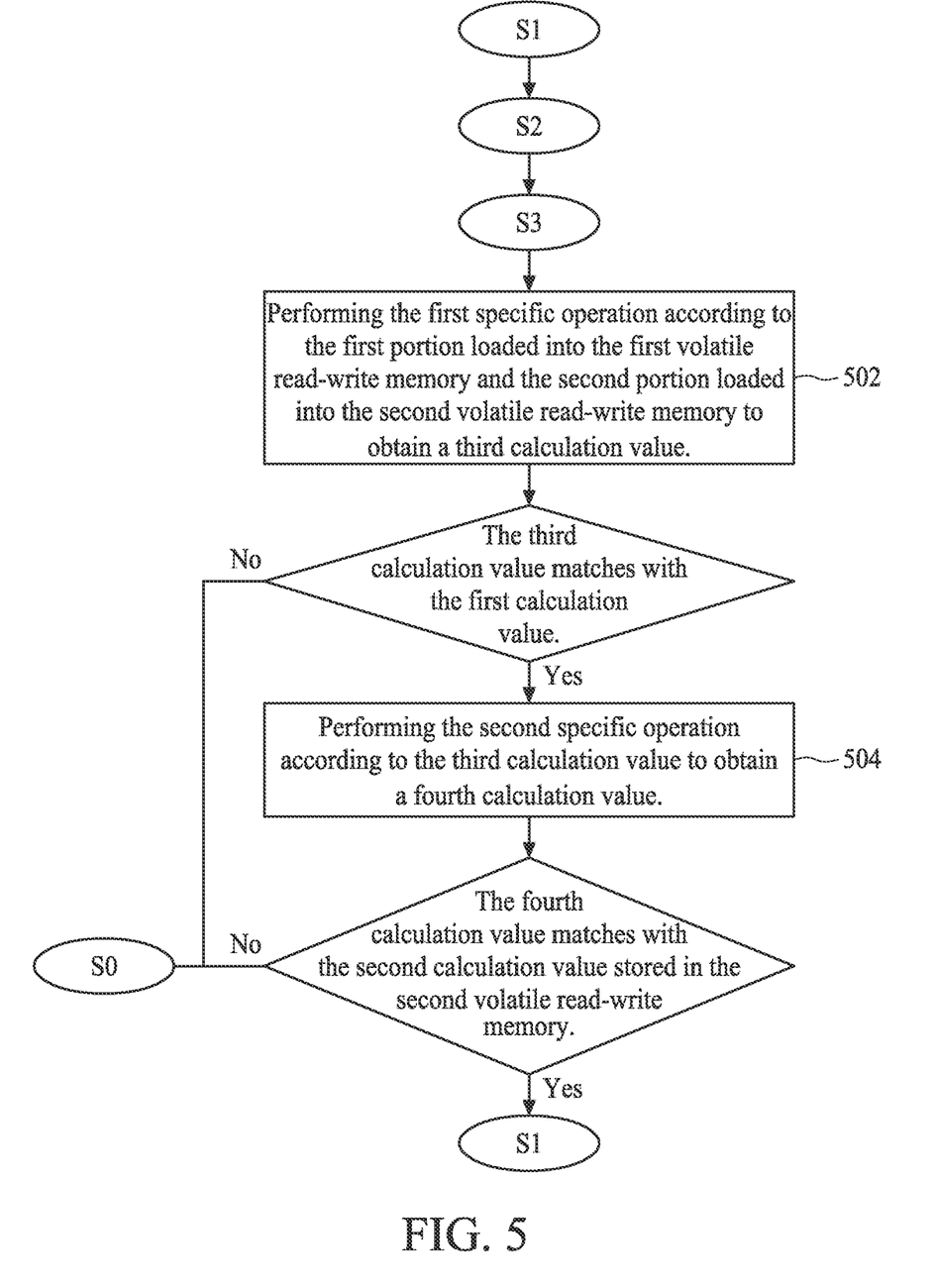

The memory 106 inside the chip 102 is configured to store a verification program, whereas the processor 104 performs the present verification method according to the verification program, so as to verify whether the content of the external memory 108 (that is, the first portion IMG1 of the firmware image IMG) is tampered or not. FIG. 4 and FIG. 5 illustrate a first embodiment of the verification method according to the present disclosure which will be described below with reference to FIG. 3 to FIG. 5.

Referring to FIG. 4; at the bootloader mode S0, in a first step 402, in order to ensure that the executable program is from a trusted party, the firmware image IMG needs to be verified before being loaded into the memory 108 and the memory 112; the verification method is usually a digital signature-based algorithm, which is an asymmetric cryptography operation and has extremely high security level. Specifically, the firmware image IMG includes a digital signature signed by the issuer through a private key, and in the bootloader mode S0, a corresponding public key is required for verifying whether the digital signature is correct. The public key can be stored in the memory 114 inside the chip 102, but may also be stored in the memory 110 outside the chip 102 in the case where the capacity of the memory 114 is insufficient. Meanwhile, a public key predetermined calculation value of the public key is stored in the memory 114 for verifying the correctness of the public key stored in the memory 110. The public key predetermined calculation value in this embodiment is generated by performing a hash operation on the public key without a password, but the present disclosure is not limited thereto. When the public key is stored in the memory 110 outside the chip 102, the public key needs to be verified specifically; first, the public key in the memory 110 outside the chip 102 is hashed without a password; then, the calculated result is compared with a public key predetermined calculation value stored in the memory 114, and when they match, the verification is passed.

In addition to the public key, a predetermined calculation value of the firmware image IMG is also required to verify the digital signature; in this embodiment, the predetermined calculation value is generated by performing a first specific operation on a protected portion of the firmware image IMG, wherein the first specific operation may be a hash operation without a password, but the present disclosure is not limited thereto. The predetermined calculation value can be stored in the firmware image IMG in advance. Since the predetermined calculation value is stored in the memory 110 outside the chip 102, it also needs to be verified; first, the first specific operation is performed on the protected portion of the firmware image IMG, and then the result is compared with the predetermined calculation value, and when they match, the verification is passed.

Then, the digital signature is calculated according to the public key and the predetermined calculation value and based on an algorithm of the digital signature; thereafter, the calculated digital signature is compared with the digital signature within the firmware image IMG, and when they match, the verification for the firmware image IMG is successful, and then the method enters step 404; otherwise the loading fails.

In step 404, the first portion IMG1 of the firmware image IMG is loaded from the memory 110 into the memory 108 outside the chip 102, and the second portion IMG2 of the firmware image IMG is loaded from the memory 110 into the memory 112 inside the chip 102, and a memory address and a size of each of the loaded first portion IMG1 and second portion IMG2 are also recorded, respectively. Since the loading process may also be attacked, the verification is also performed on the first portion IMG1 and the second portion IMG2 that are loaded in step 406. Specifically, in step 406, the first specific operation is performed on the first portion IMG1 and the second part IMG2 after loading, so as to obtain the first calculation value, and calculated result (such as the first calculation value) is compared with the predetermined calculation value that is stored in the firmware image IMG in advance, and when they match, the verification is successful and the method proceeds to step 408, otherwise the loading fails.

In step 408, a second specific operation is performed according to the calculated result obtained in step 406, so as to obtain a second calculation value; in this embodiment, to further strengthen the security, the second specific operation may be a hash operation with a password, but the present disclosure is not limited thereto; in some embodiments, the second specific operation may be the same with the first specific operation, i.e., both are hash operations without a password. When the second specific operation is a hash operation with a password, then a corresponding key is stored in the memory 114 inside the chip 102 in advance, and said key is used when performing the second specific operation according to the calculated result obtained in step 406 to obtain the calculated result.

In step 410, the calculated result (e.g., the second calculation value) obtained in step 408 is stored in the memory 112 inside the chip 102, and the chip enters the active mode S1. Since the memory 112 inside the chip 102 is safer than the memory 110 outside the chip 102, when the chip 102 leaves the power saving mode, there is no need to perform the digital signature verification and firmware image IMG loading steps shown in FIG. 4; rather, it is feasible to only verify the first portion IMG1 and second portion IMG2 that are loaded according to the calculated result obtained in step 408; therefore, a large amount of operation time required for the digital signature verification process can be omitted, and details thereof are described below.

In FIG. 5, the chip 102 enters the power saving mode S2 from the active mode S1, and after it receives a trigger event, it enters an event trigger mode S3; before it enters the active mode S1 once again, the verification process in steps 502 to 504 is required to ensure that the first portion IMG1 stored in the memory 108 outside the chip 102 and the second portion IMG2 stored in the memory 112 inside the chip 102 are not tampered at the time period between the previous entry into the active mode S1 and the next entry into the active mode S1.

The step 502 is the same as the step 406; specifically, in step 502, a first specific operation is performed according to the first portion loaded into the first volatile read-write memory and the second portion loaded into the second volatile read-write memory, so as to obtain a third calculation value. Then, the calculated result (e.g., the third calculation value) from step 502 is compared with the first calculation value, and when they match, then the method proceeds to step 504; otherwise, the chip enters the bootloader mode S0 to redo the digital signature verification and firmware image IMG loading steps once. The step 504 is the same as the step 408; specifically, in step 504, a second specific operation is performed according to the third calculation value to perform, so as to obtain a fourth operation. Then, the result (e.g., the fourth calculation value) obtained in step 504 is compared with the calculated result (e.g., the second calculation value) obtained in step 408 and stored in the memory 112 inside the chip 102, and when they match, the active mode S1 is entered; otherwise, the bootloader mode S0 is entered to redo the digital signature verification and firmware image IMG loading steps once. In some embodiments, it is also feasible that the calculated result from step 502 is not compared with the first calculation value but the method proceeds directly to step 504, and the same verification effect can be attained by using the result obtained in step 504 only.

Figure 6:
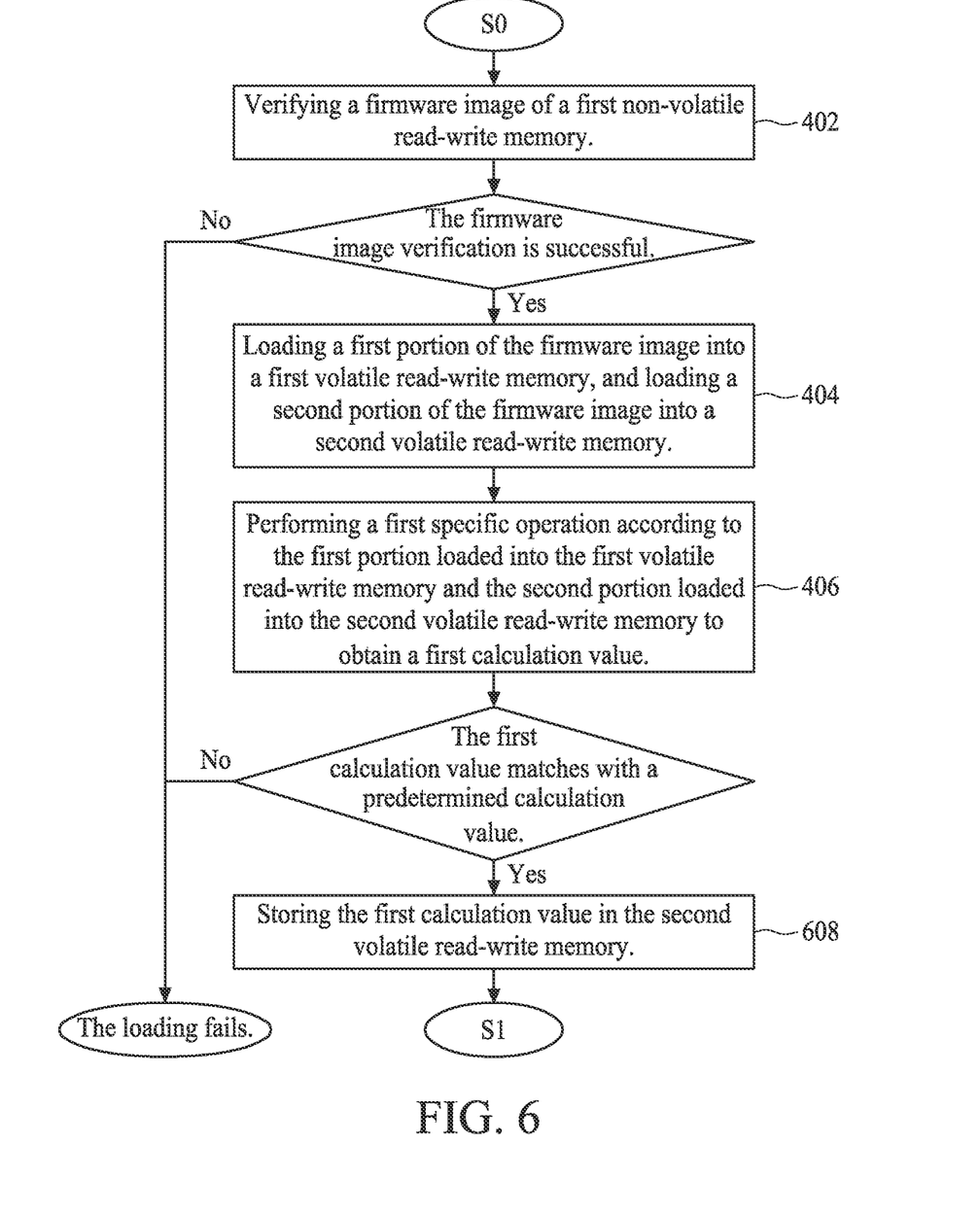
FIG. 6 and FIG. 7 illustrate a second embodiment of the verification method according to the present disclosure.
Figure 7:
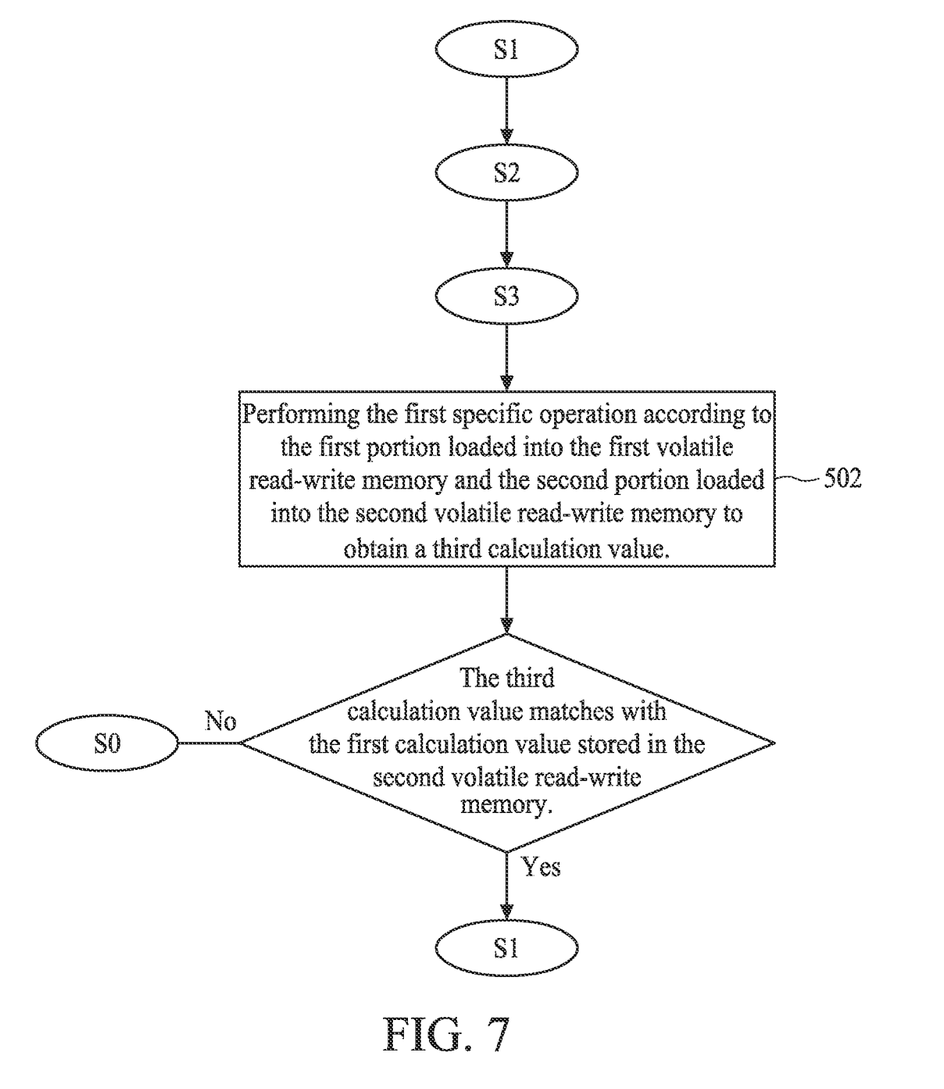

FIG. 6 and FIG. 7 illustrate a second embodiment of the verification method according to the present disclosure; FIG. 6 differs from FIG. 4 in that when the calculated result obtained in step 406 of FIG. 6 matches with the predetermined calculation value stored in the firmware image IMG in advance, then, in step 608, the calculated result (e.g., the first calculation value) obtained in step 406 is stored in the memory 112 inside the chip 102, and the chip enters the active mode S1. Since the memory 112 inside the chip 102 is safer than the memory 110 outside the chip 102, when the chip 102 leaves the power saving mode, there is no need to perform the digital signature verification and firmware image IMG1 loading steps shown in FIG. 4; rather, it is feasible to verify the first portion IMG1 and second portion IMG2 that are loaded according to the calculated result obtained in step 406.

Similarly, FIG. 7 differs from FIG. 5 in that the calculated result obtained in step 502 is compared with the calculated result (e.g., the first calculation value) obtained in step 406 and pre-stored in the memory 112 inside the chip 102, and when they match, the active mode S1 is entered; otherwise, the bootloader mode S0 is entered, to redo the digital signature verification and firmware image IMG loading steps once.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A verification method for verifying a content of a first volatile read-write memory of a chip, wherein a first non-volatile read-write memory of the chip stores a firmware image, the firmware image includes a predetermined calculation value, the chip includes a second volatile read-write memory, and the verification method comprises:
   verifying the firmware image of the first non-volatile read-write memory at a bootloader mode;
   loading a first portion of the firmware image into the first volatile read-write memory, and loading a second portion of the firmware image into the second volatile read-write memory;
   performing a first specific operation according to the first portion loaded into the first volatile read-write memory and the second portion loaded into the second volatile read-write memory to obtain a first calculation value;
   when the first calculation value matches with the predetermined calculation value, performing a second specific operation according to the first calculation value to obtain a second calculation value; and
   storing the second calculation value in the second volatile read-write memory and entering an active mode.

2. The verification method of claim 1, further comprising:
   after controlling the chip to enter a power saving mode from the active mode, controlling the chip to enter an event trigger mode according to a trigger event, and performing the first specific operation according to the first portion loaded into the first volatile read-write memory and the second portion loaded into the second volatile read-write memory to obtain a third calculation value;
   performing the second specific operation according to the third calculation value to obtain a fourth calculation value; and
   when the fourth calculation value matches with the second calculation value stored in the second volatile read-write memory, controlling the chip to enter the active mode.

3. The verification method of claim 2, wherein the chip further includes a second non-volatile read-write memory, and the second non-volatile read-write memory stores a key, and the step of performing the second specific operation according to the first calculation value to obtain the second calculation value comprises:
   performing the second specific operation according to the first calculation value and the key to obtain the second calculation value; and
   the step of performing the second specific operation according to the third calculation value to obtain the fourth calculation value comprises:
   performing the second specific operation according to the third calculation value and the key to obtain the fourth calculation value.

4. The verification method of claim 1, wherein the step of storing the second calculation value in the second volatile read-write memory comprises:
 storing the second calculation value, together with a size and a loading address of each of the first portion and the second portion, in the second volatile read-write memory.

5. The verification method of claim 2, further comprising:
 when the fourth calculation value mismatches with the second calculation value, controlling the chip to enter the bootloader mode.

6. The verification method of claim 2, wherein the step of performing the second specific operation according to the third calculation value to obtain the fourth calculation value comprises:
 when the third calculation value matches with the first calculation value, performing the second specific operation according to the third calculation value to obtain the fourth calculation value.

7. The verification method of claim 2, further comprising:
 when the third calculation value mismatches with the first calculation value, controlling the chip to enter the bootloader mode.

8. The verification method of claim 3, wherein the firmware image further includes a digital signature, and the first non-volatile read-write memory further stores a public key, and the step of verifying the firmware image of the first non-volatile read-write memory comprises:
 verifying the public key;
 performing the first specific operation according to the firmware image to obtain a fifth calculation value;
 when the fifth calculation value matches with the predetermined calculation value, performing a third specific operation according to the fifth calculation value and the public key to obtain a sixth calculation value; and
 comparing the sixth calculation value with the digital signature.

9. The verification method of claim 8, wherein the second non-volatile read-write memory further stores a public key predetermined calculation value, and the step of verifying the public key comprises:
 performing the first specific operation according to the public key to obtain a seventh calculation value; and
 comparing the seventh calculation value with the public key predetermined calculation value.

10. The verification method of claim 1, wherein the first specific operation is a hashing algorithm without a password, and the second specific operation is a hashing algorithm with a password.

11. The verification method of claim 8, wherein the third specific operation is an asymmetrical cryptography operation.

12. A verification method for verifying a content of a first volatile read-write memory of a chip, wherein a first non-volatile read-write memory of the chip stores a firmware image, the firmware image includes a predetermined calculation value, the chip includes a second volatile read-write memory, and the verification method comprises:
 verifying the firmware image of the first non-volatile read-write memory at a bootloader mode;
 loading a first portion of the firmware image into the first volatile read-write memory, and loading a second portion of the firmware image into the second volatile read-write memory;
 performing a first specific operation according to the first portion loaded into the first volatile read-write memory and the second portion loaded into the second volatile read-write memory to obtain a first calculation value;
 when the first calculation value matches with the predetermined calculation value, storing the first calculation value in the second volatile read-write memory and entering an active mode.

13. The verification method of claim 12, further comprising:
 after controlling the chip to enter a power saving mode from the active mode, controlling the chip to enter an event trigger mode according to a trigger event, and performing the first specific operation according to the first portion loaded into the first volatile read-write memory and the second portion loaded into the second volatile read-write memory to obtain a third calculation value;
 when the third calculation value matches with the first calculation value stored in the second volatile read-write memory, controlling the chip to enter the active mode.

14. The verification method of claim 12, wherein the step of storing the first calculation value in the second volatile read-write memory comprises:
 storing the first calculation value, together with a size and a loading address of each of the first portion and the second portion, in the second volatile read-write memory.

15. The verification method of claim 13, further comprising:
 when the third calculation value mismatches with the first calculation value stored in the second volatile read-write memory, controlling the chip to enter the bootloader mode.

16. The verification method of claim 12, wherein the firmware image further includes a digital signature, and the chip further includes a second non-volatile read-write memory, the first non-volatile read-write memory further stores a public key, and the step of verifying the firmware image of the first non-volatile read-write memory comprises:
 verifying the public key;
 performing the first specific operation according to the firmware image to obtain a fourth calculation value;
 when the fourth calculation value matches with the predetermined calculation value, performing a third specific operation according to the fourth calculation value and the public key to obtain a fifth calculation value; and
 comparing the fifth calculation value with the digital signature.

17. The verification method of claim 16, wherein the second non-volatile read-write memory further stores a public key predetermined calculation value, and the step of verifying the public key comprises:
 performing the first specific operation according to the public key to obtain a sixth calculation value; and
 comparing the sixth calculation value with the public key predetermined calculation value.

18. The verification method of claim 12, wherein the first specific operation is a hashing algorithm without a password.

19. The verification method of claim 16, wherein the third specific operation is an asymmetrical cryptography operation.

20. A system, comprises:
 a first volatile read-write memory; and a first non-volatile read-write memory, configured to store a firmware image, wherein the firmware image includes a predetermined calculation value;

a chip, coupled to the first volatile read-write memory and the first non-volatile read-write memory, the chip including:

a second volatile read-write memory;

a verification program memory, configured to store a verification program;

a processor, configured to perform a verification method for verifying a content of the first volatile read-write memory according to the verification program, the verification method including:

verifying the firmware image of the first non-volatile read-write memory at a bootloader mode;

loading a first portion of the firmware image into the first volatile read-write memory and loading a second portion of the firmware image into the second volatile read-write memory;

performing a first specific operation according to the first portion loaded into the first volatile read-write memory and the second portion loaded into the second volatile read-write memory to obtain a first calculation value;

when the first calculation value matches with the predetermined calculation value, performing a second specific operation according to the first calculation value to obtain a second calculation value; and storing the second calculation value in the second volatile read-write memory and entering an active mode.

\* \* \* \* \*